United States Patent [19]

Nelle

[11] Patent Number: 4,606,642

[45] Date of Patent: Aug. 19, 1986

[54] MEASURING ARRANGEMENT FOR THE CLEAR SCANNING OF AT LEAST ONE REFERENCE MARK ALLOCATED TO A GRADUATION

[75] Inventor: Guenther Nelle, Bergen, Fed. Rep. of Germany

[73] Assignee: Dr. Johannes Heidenhain GmbH, Traunreut, Fed. Rep. of Germany

[21] Appl. No.: 614,333

[22] Filed: May 25, 1984

[30] Foreign Application Priority Data

Jul. 16, 1983 [DE] Fed. Rep. of Germany ....... 3325803

[51] Int. Cl.⁴ ............................................. G01B 11/14
[52] U.S. Cl. .................................. 356/374; 33/125 C; 250/237 G; 356/375
[58] Field of Search ............... 356/373, 374, 375, 395; 33/125 A, 125 C; 250/273 G, 231 SE

[56] References Cited

U.S. PATENT DOCUMENTS 4,403,859 9/1983 Ernst ................................... 356/374

FOREIGN PATENT DOCUMENTS 1548874 10/1970 Fed. Rep. of Germany.
2511350 9/1975 Fed. Rep. of Germany.
2952106 11/1982 Fed. Rep. of Germany.
157118 9/1982 Japan .............................. 250/237 G

OTHER PUBLICATIONS

Bremer, Science and Industry No. 16, 1980, pp. 1–5.

Primary Examiner—F. L. Evans
Attorney, Agent, or Firm—Willian Brinks Olds Hofer Gilson & Lione Ltd.

[57] ABSTRACT

A measuring system for measuring the relative position of two objects is provided with a scale which defines reference marks absolutely allocated to a graduation. The graduation and the reference marks are scanned in a scanning unit by associated scanning fields of a scanning plate. For the clear and unambiguous scanning of the reference marks, and for the optimal scanning of the graduation, (1) the optical path length of the light rays between the graduation and the associated scanning fields and (2) the optical path length of the light rays between the reference marks and the associated scanning fields are provided with a phase difference. In this way, the optical path length for multiple scanning paths can be individually optimized.

11 Claims, 10 Drawing Figures

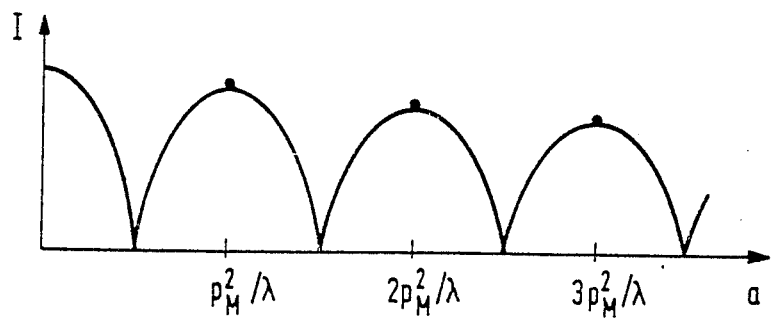
_Fig.4_
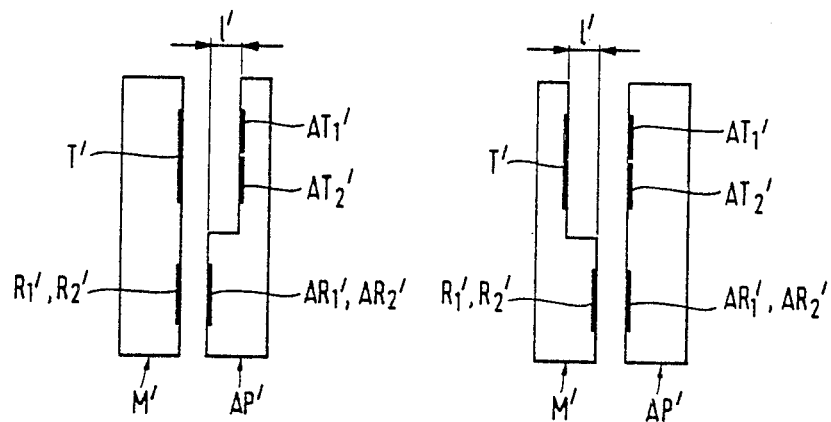
_Fig.5a_  _Fig.5b_

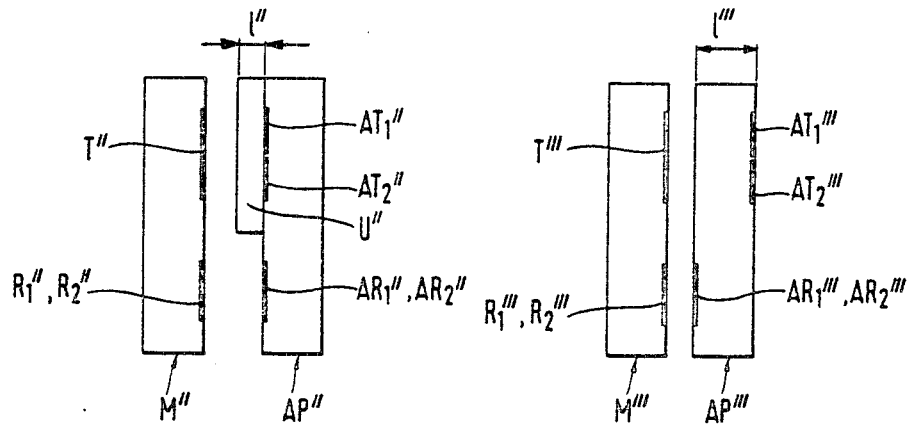
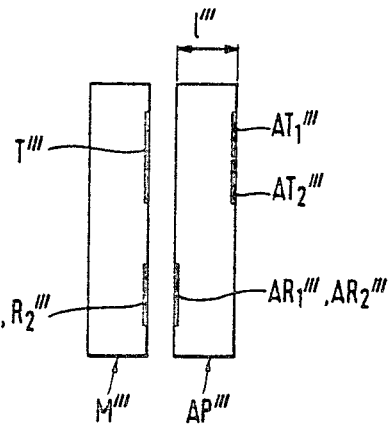
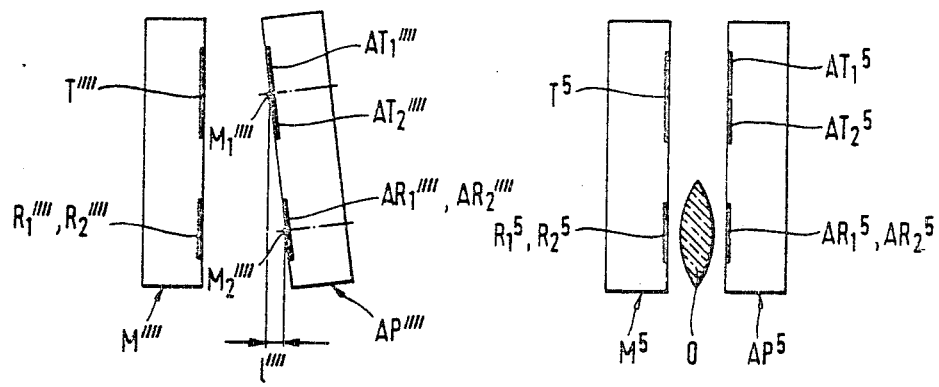
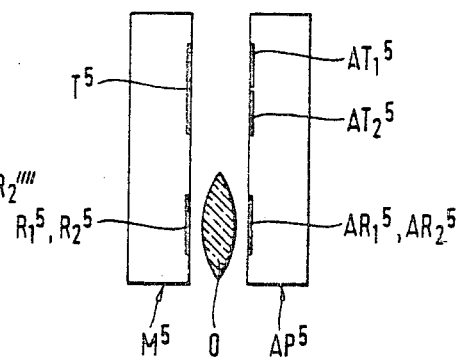

MEASURING ARRANGEMENT FOR THE CLEAR SCANNING OF AT LEAST ONE REFERENCE MARK ALLOCATED TO A GRADUATION

BACKGROUND OF THE INVENTION

The present invention relates to improvements to a measuring device for the measurement of the relative position of two objects, of the type having a scale which defines a graduation and at least one reference mark, absolutely allocated to the graduation, as well as a scanning unit which operates to scan the scale and to generate reproducible scanning pulses which act upon a counter. Such measuring devices typically include at least one scanning plate in the scanning unit for scanning the graduation and the reference marks of the scale, and the separation between the scanning plate and the scale in the direction travelled by the light beam is held at a predetermined spacing.

In such measuring arrangements the reference marks are typically used to generate electric control pulses which can be used in various ways. For example, such control pulses can be used to set the counter to a zero position, to load a preselected position value into the counter at the commencement of the measuring operation, and to monitor the measuring value against interfering impulses. Furthermore, such electric control impulses can be used to act upon and control a control arrangement engaged on the outlet side.

In code measuring systems, of the type which do not include reference marks, on occasion several graduation tracks with differing grid constants are used. In this case, it is a known practice to provide differently sized spacings between the graduation tracks and the associated scanning fields. In this system, it is the grid constants of the graduation tracks and the wavelength of the reading light of the illuminating arrangement that determine the appropriate spacings. See, for example DE-OS 15 48 874.

German patent DE-PS 29 52 106 describes an incremental angle measuring system in which a scale is provided which includes a measuring graduation and a number of reference marks, each of which defines a unique line group distribution. The individual reference marks are scanned by respective scanning fields included in a scanning unit, and each scanning field of the scanning unit is clearly and unambiguously allocated to a respective one of the reference marks. This is because the allocated scanning field defines the same line group distribution as that of the associated reference mark. Because of the irregular line group distributions, the distance between the scale and the scanning plate is preferably at most about $4d^2/\lambda$, where d is the width of the narrowest line of the line graduation of the reference mark and $\lambda$ is the center of gravity wavelength of the light. Typically, this spacing is desirable for clear and error free scanning of the reference marks.

In addition, it is known that for the scanning of a regular, periodic incremental graduation of a scale, the scanning distance between the scale and the scanning plate does not need to be maintained at a single definite spacing. Rather, a number of differing spacings are possible. When the graduation of a scale is traversed by light in a parallel beam path, diffraction patterns of the graduation of the scale are generated which can be scanned with a scanning graduation of like grid constant. Only at certain planes behind the graduation plane of the scale does the interference associated with the diffraction patterns provide an optimal pattern for scanning. In general, for a graduation with a grid constant $P_M$ and a center of gravity wavelength $\lambda$ of the light, the optimal scanning planes are separated from the graduation plane of the scale by a distance equal to $n \cdot P_M^2/\lambda$ ($n = 0, 1, 2, \ldots$). Thus, optimal scanning signals can be generated at a separation equal to $n \cdot P_M^2/\lambda$ between the graduation plane of the scanning plate and the graduation plane of the scale (see *Machine Shop Magazine*, April, 1962, p. 208). Larger spacings between the scale and the scanning plate bring advantages in that the measuring device is less sensitive to mechanical influences, such as for example, processing chips or shavings. In the event of small spacings between the scanning plate and the scale, such processing chips or shavings can more readily become jammed between the scale and the scanning plate and can lead to damage to the graduations of the scale and the scanning plate. Furthermore, when larger separations are used the scale and the scanning plate can more readily be cleaned in the event of fouling. Yet another advantage of larger separations between the scale and the scanning plate arises from the fact that spacing tolerances are also greater with these greater spacings. For this reason, lower demands can be placed on the precision of guidance of the scanning plate with respect to the scale. Furthermore, in the event larger separations are used between the scale and the scanning plate, the periodic scanning signals generated in connection with the incremental graduation of the scale have a more sinusoidal signal form, so that the signal period of the scanning signal can better be subdivided by interpolation.

In the past, the utilization of very large spacings between the scale and the scanning plate in the scanning of the incremental graduation has been possible without interposed imaging optics only in measuring devices which include no reference marks on the scale. This is because for the clear scanning of the reference marks, as set out above, a predetermined small distance between the scale and the scanning unit must not be exceeded.

SUMMARY OF THE INVENTION

The present invention is directed to an improved measuring device of the type which includes a scale that defines reference marks, which makes possible a clear scanning of the reference marks as well as an optimal scanning of the graduation of the scale.

According to this invention, a measuring system of the type described initially above includes at least one scanning plate which defines at least one graduation scanning field and at least one reference mark scanning field. Means are provided for establishing a phase difference between (1) the optical path length between the graduation and the graduation scanning field, and (2) the optical path length between the reference mark and the reference mark scanning field. An alternate form of this invention utilizes graduation and reference mark scanning fields arranged such that the separation between the graduation and the graduation scanning field is equal to the separation between the reference mark and the reference mark scanning field. In this alternate embodiment, an imaging optic is positioned between the scanning plate and the scale and aligned with the reference mark scanning field such that reliable scanning of the reference mark is provided, at the prevailing separation between the reference mark and the reference mark scanning field.

The present invention provides important advantages in that a measuring device of the type described above is provided with remarkably simple means that allow the most favorable spacings required for trouble free scanning of both the incremental graduation and the reference marks of the scale. These separations can be selected substantially independently so that the measuring accuracy and the degree of subdivision in an interpolation of the measuring values are improved. Furthermore, by providing greater spacings between the graduation of the scale and the associated scanning fields of the scanning plate, lower demands can be placed on the guidance accuracy of the scanning plate with respect to the scale. This is true since such larger spacings are typically associated with larger spacing tolerances. With such a measuring device, in which a predetermined small distance between the reference marks and the associated scanning fields must not be exceeded, no high precision guides have to be provided. For this reason, a simply constructed and economical measuring arrangement is provided. Furthermore, the preferred embodiments described below do not result in any increase of the outside dimensions of the measuring system, so that the flexibility of use of these measuring systems is not impaired. Further advantageous features of the invention are set forth in the dependant claims.

The invention itself, together with further objects and attendant advantages, will best be understood by reference to the following description, taken in conjunction with the accompanying drawings.

BRIEF DESCRIPTION OF THE DRAWINGS

FIG. 4 is a graphic representation of the amplitude of light modulation measured at various spacings between the scale and scanning plate of FIGS. 2 and 3.

FIGS. 5a-5f are schematic representations of five preferred embodiments of the improvement of this invention suitable for use in the measuring device of FIG. 1.

DETAILED DESCRIPTION OF THE PRESENTLY PREFERRED EMBODIMENTS

Figure 1:
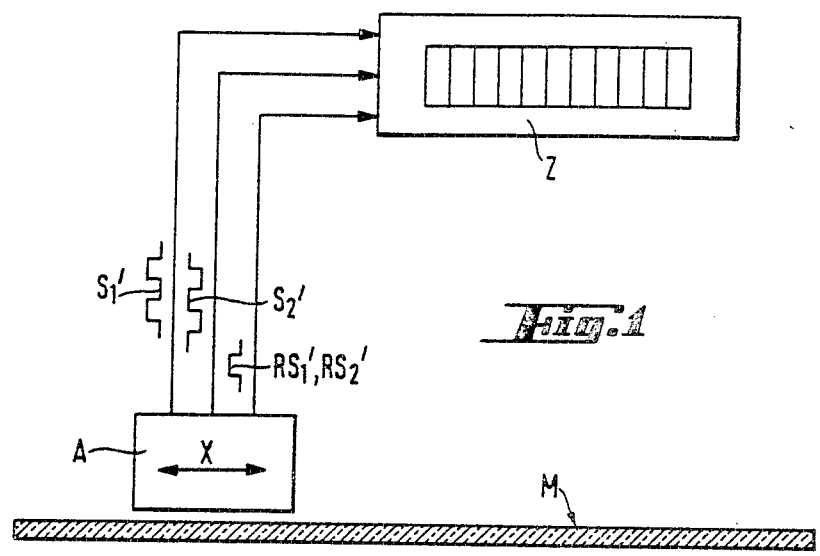
FIG. 1 is a schematic representation of an incremental measuring device.
Figure 2:
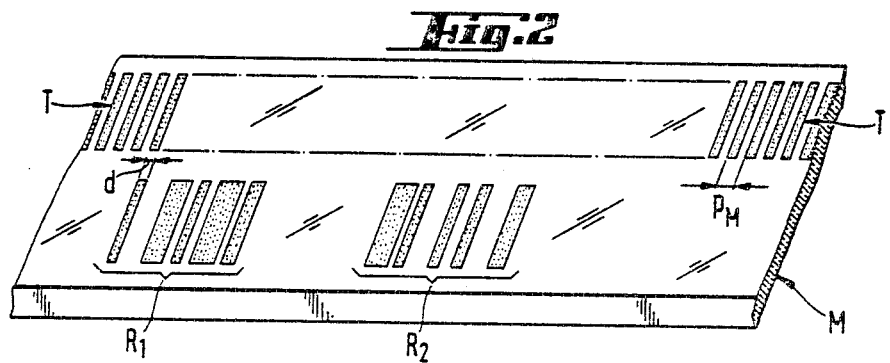
FIG. 2 is a partial perspective view of the scale of the measuring device of FIG. 1, which defines a measuring graduation and a number of reference marks.

Turning now to the drawings, FIG. 1 schematically shows a photoelectric incremental length measuring device that includes a measuring scale M and a scanning unit A. The scale M and the scanning unit A are connected in each case (in a manner not shown) with objects to be measured, such as two machine parts of a processing machine. The scale M defines an incremental graduation T in the form of a line grid (FIG. 2) which is scanned in direct light, without contact, photoelectrically by the scanning unit A. Alongside the graduation T there are arranged two reference marks $R_1$, $R_2$ which are positioned at predetermined absolute positions with respect to the graduation T. Each of the reference marks $R_1$, $R_2$ is made up of a respective group of lines having an irregular line distribution. The line group distributions of the two reference marks $R_1$, $R_2$ are preferably as dissimilar as possible from one another. The scanning unit A generates periodic scanning signals $S_1$, $S_2$ as the scanning unit A moves in the measuring direction X. These scanning signals $S_1$, $S_2$ are amplified in the scanning unit A and converted into square wave signals $S_1'$, $S_2'$, which are applied to control an electronic counter Z which displays the measurement value in digital form. The square wave signals $S_1'$, $S_2'$ are displaced with respect to one another by a quarter of the grid constant $P_M$ (graduation period) of the graduation T in order to allow the direction of scanning to be determined. Reference signals $RS_1$, $RS_2$ are generated in response to the reference marks $R_1$, $R_2$, and these reference signals $RS_1$, $RS_2$, are converted into square wave signals $RS_1'$, $RS_2'$ which are similarly applied to the counter Z.

The reference signals $RS_1$, $RS_2$ can be used to trigger various functions in the counter Z. For example, by evaluating the reference signals $RS_1$, $RS_2$, an incremental measuring system can be made into a quasi-absolute measuring device if to each reference mark $RS_1$, $RS_2$ a number is allocated which represents its absolute position with respect to an invariable zero point. Furthermore, a predetermined one of the reference marks $RS_1$, $RS_2$ can be used to set the counter Z to the value zero when the associated one of the reference signals $RS_1$, $RS_2$ obtained from that reference mark $R_1$, $R_2$ is detected.

Figure 3:
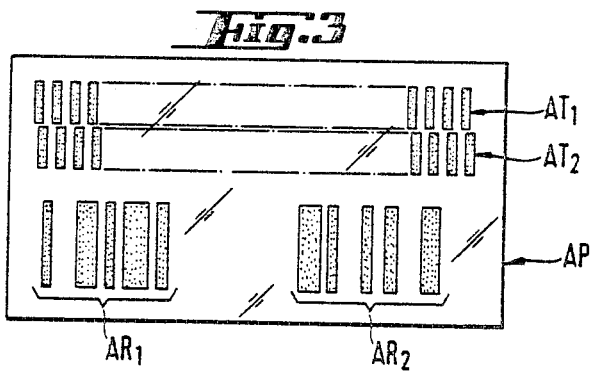
FIG. 3 is a plan view of a scanning plate which defines scanning fields and is included in the scanning unit of the measuring device of FIG. 1.

A scanning plate AP such as that shown in FIG. 3 is provided in the scanning unit A for the scanning of the scale M. This scanning plate AP defines two scanning fields $AT_1$, $AT_2$ for the scanning of the graduation T. These two scanning fields $AT_1$, $AT_2$ are displaced with respect to one another by a quarter of the grid constant $P_M$ of the graduation T. The two scanning fields $AT_1$, $AT_2$ are otherwise identical to the graduation T. Photosensors (not shown) are included in the scanning unit A and aligned with the scanning fields $AT_1$, $AT_2$ in order to generate the scanning signals $S_1$, $S_2$. The scanning plate AP also includes scanning fields $AR_1$, $AR_2$ for the scanning of the reference marks $R_1$, $R_2$. The line group distributions of the individual scanning fields $AR_1$, $AR_2$ are identical with the line group distributions of the corresponding reference marks $R_1$, $R_2$. For this reason, the reference signals $RS_1$, $RS_2$ are generated when the reference marks $R_1$, $R_2$ are aligned with the respective ones of the scanning fields $AR_1$, $AR_2$. Because the line distributions of the reference mark $R_1$ and the scanning field $AR_1$ correspond and the line distributions of the reference mark $R_2$ and the scanning field $AR_2$ correspond, it is assured that the scanning signal $RS_1$ is only generated when the scanning field $AR_1$ is aligned with the reference mark $R_1$, and that the reference signal $RS_2$ is only generated when the scanning field $AR_2$ is aligned with the reference mark $R_2$. If, for example, the scanning field $AR_1$ is moved past the nonassociated reference mark $R_2$, no reference signal is generated.

When collimated light passes through the periodic incremental graduation T of the scale M, refraction patterns of the graduation T of the scale M are generated in certain planes behind the plane of the graduation T of the scale M by virtue of interference effects of the light rays refracted by the graduation T. With a grid constant $P_M$ of the graduation T of the scale M and a center of gravity wavelength $\lambda$, the spacings of these planes is given by the formula $n \cdot P_M^2/\lambda$ ($n=0, 1, 2, \ldots$) with respect to the plane of the graduation T of the scale M. FIG. 4 represents the amplitudes J of light modulation arising during relative movement between two graduations of equal grid constant as a function of the separation a between the two graduations. As shown in FIG. 4, maximum modulation and therefore optimal scanning signals $S_1$, $S_2$ are generated only at the discrete distances $n \cdot P_M/\lambda$ of the plane of the scanning fields $AT_1$, $AT_2$ of the scanning plate AP from the plane of the graduation T of the scale M.

Because of the irregular line group distributions used for the reference marks $R_1$, $R_2$ on the scale M, optimum scanning of the reference marks $R_1$, $R_2$ is obtained when the distance between the reference marks $R_1$, $R_2$ and the associated scanning fields $AR_1$, $AR_2$ on the scanning plate AP, measured in the direction of travel of light, is at most about $4d^2/\lambda$, where d signifies the width of the narrowest line of the grid graduations of the reference marks $R_1$, $R_2$. However, as explained above, optimal scanning of the graduation T of the scale M requires that the distance between the graduation T and the associated scanning fields $AT_1$, $AT_2$ on the scanning plate AP in the direction of the light beam be about equal to $n \cdot p^2/\lambda$ (n=1, 2, 3, . . .).

According to this invention, these conflicting requirements are met by adjusting appropriately on the one hand the optical path length of the light rays passing through the graduation T of the scale M and the associated scanning fields $AT_1$, $AT_2$ of the scanning plate AP, and on the other hand the optical path length of the light rays passing through the reference marks $R_1$, $R_2$ of the scale M and the associated scanning fields $AR_1$, $AR_2$ of the scanning plate AP. This is accomplished in certain embodiments of this invention by providing a phase difference h between these two optical path lengths, in which h is equal to the difference between the selected graduation scanning distance $n \cdot P_M^2/\lambda$ and the reference mark scanning distance $4d^2/\lambda$. This phase difference h is equal to $c \cdot l$, where l is the difference in path lengths and c is the index of refraction obtaining in this path length difference.

In order to achieve the desired phase difference $h = c' \cdot l'$, according to FIG. 5a the scanning fields $AT_1'$, $AT_2'$ and the scanning fields $AR_1'$, $AR_2'$ of the scanning plate AP' are displaced parallel to one another in the direction of the light rays by the interval $l'$. The graduation T' and the reference marks $R_1'$, $R_2'$ of the scale M' lie in a single plane. c' signifies the index of refraction of the medium traversed by the light rays.

FIG. 5b shows a second preferred embodiment in which the same phase difference $h = c' \cdot l'$ is obtained by displacing the graduation T' by the interval $l'$ with respect to the reference marks $R_1'$, $R_2'$ of the scale M' in the direction of the light beam path. The graduation T' and the reference marks $R_1'$, $R_2'$ remain parallel to one another in this embodiment but offset by the distance $l'$. The scanning fields $AT_1'$, $AT_2'$ and the scanning fields $AR_1'$, $AR_2'$ of the scanning plate AP' lie in a single plane.

FIG. 5c shows a third preferred embodiment in which a desired phase difference $h = c'' \cdot l''$ is achieved even though the scanning fields $AT_1''$, $AT_2''$ and the scanning fields $AR_1''$, $AR_2''$ of the scanning plate AP'' lie in a single plane. Furthermore, the graduation T'' and the reference marks $R_1''$, $R_2''$ of the scale M'' also lie in a single plane. The desired phase difference h is achieved by a transparent layer U'' having a layer thickness $l''$ in the light beam direction and a refraction index $c''$. This transparent layer U'' is arranged in front of the scanning fields $AT_1''$, $AT_2''$ so as to obtain the desired phase difference between the graduation optical path and the reference mark optical path.

FIG. 5d shows a fourth preferred embodiment for the achievement of the desired phase difference $h = c''' \cdot l'''$. In this embodiment the transparent scanning plate AP''' defines a layer thickness $l'''$ in the light beam direction and a fraction index $c'''$. The scanning fields $AR_1'''$, $AR_2'''$ are arranged on the surface of the scanning plate AP''' facing the scale M''', and the scanning fields $AT_1'''$, $AT_2'''$ are arranged on the surface of the scanning plate AP''' facing away from the scale M'''. As shown in FIG. 5d the graduation T''' and the reference marks $R_1'''$, $R_2'''$ are coplanar. In this embodiment, it is the scanning plate AP''' itself which provides the desired difference in phase between the scanning paths of the graduation T''' and the reference marks $R_1'''$, $R_2'''$.

FIG. 5e shows a fifth preferred embodiment for the achievement of the desired phase difference $h = c'''' \cdot l''''$. In this embodiment, the scanning fields $AT_1''''$, $AT_2''''$ and the scanning fields $AR_1''''$, $AR_2''''$ of the scanning plate AP'''' lie in a single plane which is inclined toward the plane of the graduation T'''' and of the reference marks $R_1''''$, $R_2''''$ of the scale M''''. The inclination of the scanning plate AP'''' is about an axis of rotation running in the measuring direction X in such a way that the center point $M_1''''$ of the scanning fields $AT_1''''$, $AT_2''''$ in the light beam direction is displaced by the interval $l''''$ with respect to the center point $M_2''''$ of the scanning fields $AR_1''''$, $AR_2''''$. As before, the symbol $c''''$ is used to indicate the index of refraction of the medium traversed by the light rays.

FIG. 5f shows a sixth preferred embodiment of this invention in which the graduation $T^5$ and the reference marks $R_1^5$, $R_2^5$ of the scale $M^5$ have the same distance (for example $n \cdot P_M^2/\lambda$) from the associated scanning fields $AT_1^5$, $AT_2^5$, and $AR_1^5$, $AR_2^5$ of the scanning plate $AP^5$. In order to obtain optimal scanning of the reference marks $R_1^5$, $R_2^5$, there is provided an imaging optic O such as a converging lens which has optical properties to enable appropriate scanning of the reference marks $R_1^5$, $R_2^5$ in the face of greater than optimal separation between the reference marks $R_1^5$, $R_2^5$ and the associated scanning fields $AR_1^5$, $AR_2^5$.

The present invention can also be used with particular advantages in other measuring systems, in which the graduations of the scale and of the scanning fields of the scanning plate are not identical. For example, in a three grid measuring system, in which the graduation of the scanning field is twice as great as the graduation of the scale, particular advantages are obtained. In such a three grid measuring system (as described for example in German DE-OS 25 11 350), using a non-parallel beam path there can be achieved very large spacings with relatively great spacing tolerances. Of course, it should be understood that a wide range of changes and modifications can be made to the preferred embodiments described above. It is therefore intended that the foregoing detailed description be regarded as illustrative rather than limiting, and that it be understood that it is the following claims, concluding all equivalents, which are intended to define the scope of this invention.

I claim:

1. In a measuring system for measuring the relative position of two objects, of the type comprising: a scale which defines a graduation and at least one reference mark absolutely positioned with respect to the graduation; a scanning unit which includes at least one scanning plate for scanning the graduation and the reference mark along respective optical paths and for generating reference pulses in response to the reference marks; and means for utilizing the reference pulses as an indication of absolute position; wherein the scale and the scanning plate are shiftable with respect to one another at a predetermined spacing therebetween; the improvement comprising;

at least one graduation scanning field defined by the at least one scanning plate;

at least one reference mark scanning field defined by the at least one scanning plate; and means for providing a phase difference between (1) the optical path length between the graduation and the graduation scanning field and (2) the optical path length between the reference mark and the reference mark scanning field.

2. The invention of claim 1 wherein the phase difference is equal to $h = c' \cdot l'$; wherein the graduation scanning field is parallel and offset along the optical path with respect to the reference mark scanning field by the distance $l'$; and wherein the offset distance $l'$ along the optical path is occupied by a medium having an index of refraction $c'$.

3. The invention of claim 1 wherein the phase difference is equal to $h = c' \cdot l'$; wherein the graduation is parallel and offset with respect to the reference mark by the distance $l'$ along the optical path; and wherein the offset distance $l'$ along the optical path is occupied by a medium having an index of refraction $c'$.

4. The invention of claim 1 wherein the phase difference is equal to $h'' = c'' \cdot l''$; and wherein the phase difference providing means comprises a transparent layer aligned with one of the graduation scanning field and the reference mark scanning field, said transparent layer having a layer thickness $l''$ along the optical path and an index of refraction $c''$.

5. The invention of claim 1 wherein the phase difference is equal to $h''' = c''' \cdot l'''$; wherein the scanning plate is transparent and has a layer thickness $l'''$ along the optical path and an index of refraction $c'''$; wherein one of the graduation and reference mark scanning fields is positioned on the side of the scanning plate facing the scale; and wherein the other of the graduation and reference mark scanning fields is positioned on the side of the scanning plate facing away from the scale.

6. The invention of claim 1 wherein the phase difference is equal to $h'''' = c'''' \cdot l''''$; wherein the reference mark scanning field and the graduation scanning field are in a first plane; wherein the reference mark and the graduation are in a second plane; wherein the first plane is tilted with respect to the second plane such that the difference between (1) the separation between the graduation and a central point of the graduation scanning field along the optical path and (2) the separation between the reference mark and a central point of the reference mark scanning field along the optical path is equal to $l''''$; and wherein the distance $l''''$ along the optical path is occupied by a medium having an index of refraction $c''''$.

7. The invention of claim 2 wherein the offset distance $l'$ between the planes of the graduation scanning field and the reference mark scanning field is obtained by etching the scanning plate.

8. The invention of claim 3 wherein the offset distance $l'$ between the planes of the graduation and the reference mark is obtained by etching the scale.

9. The invention of claim 1 wherein the graduation comprises a plurality of grids of grid constant $P_M$; wherein the at least one reference mark comprises at least one graduation element the narrowest graduation element of width d; wherein the light traversing the optical paths comprises a center of gravity wavelength $\lambda$, and wherein the phase difference h is represented by the relation:

$$h = n \cdot P_M^2/\lambda - 4d^2/\lambda (n = 1, 2, 3 \ldots).$$

10. In a measuring system for measuring the relative position of two objects, of the type comprising: a scale which defines a graduation and at least one reference mark absolutely positioned with respect to the graduation, the at least one reference mark defining a reference mark field; a scanning unit which includes at least one scanning plate for scanning the graduation and the reference mark along respective optical paths and for generating reference pulses in response to the reference marks; and means for utilizing the reference pulses as an indication of absolute position; wherein the scale and scanning plate are shiftable with respect to one another at a predetermined spacing therebetween; the improvement comprising:

at least one graduation scanning field defined by the at least one scanning plate;

at least one reference mark scanning field defined by the at least one scanning plate such that the separation between the graduation and the graduation scanning field is equal to the separation between the reference mark and the reference mark scanning field; and an imaging optic positioned between the scanning plate and the scale and aligned with the reference mark scanning field, said optic comprising an imaging acceptance region, said optic operative to image the portion of the reference mark field within the imaging acceptance region onto the reference mark scanning field, said optic configured to provide reliable scanning of the reference mark at the separation between the reference mark and the reference mark scanning field.

11. In a measuring system for measuring the relative position of two objects, of the type comprising: a scale which defines a graduation of grid constant $P_M$ and at least one reference mark comprising at least one line graduation, the narrowest line graduation of width d, the at least one reference mark absolutely positioned with respect to the graduation; a scanning unit which includes at least one scanning plate for scanning the graduation along a first optical path and for scanning the at least one reference mark along a second optical path wherein the light traversing the optical paths comprises a center of gravity wavelength $\lambda$, the scanning unit generating reference pulses in response to the reference marks; and means for utilizing the reference pulses as an indication of absolute position; wherein the scale and the scanning plate are shiftable with respect to one another at a predetermined spacing therebetween; the improvement comprising:

at least one graduation scanning field defined by the at least one scanning plate;

at least one reference mark scanning field defined by the at least one scanning plate; and means for providing a phase difference h between the first and second optical paths to provide for substantially optimal scanning of the graduation and reference marks by adjusting at least one of the grid constant $P_M$, the line width d and the center of gravity wavelength $\lambda$ according to the relation $h = n \cdot P_M^2/\lambda - 4d^2/\lambda (n = 1, 2, 3 \ldots).$

* * * * *

UNITED STATES PATENT AND TRADEMARK OFFICE
CERTIFICATE OF CORRECTION

PATENT NO. : 4,606,642

DATED : August 19, 1986

INVENTOR(S) : Guenther Nelle

Page 1 of 2

It is certified that error appears in the above-identified patent and that said Letters Patent is hereby corrected as shown below:

IN THE DETAILED DESCRIPTION OF
THE PRESENTLY PREFERRED EMBODIMENTS

In column 6, line 59, please delete "concluding" and substitute therefor --including--.

Please put the following in italics:

In column 5, line 35 - c 1
In column 5, line 35 - 1
In column 5, line 42 - 1'
In column 5, line 48 - 1'
In column 5, line 52 - 1'
In column 5, line 64 - 1''
In column 6, line  4 - 1'''
In column 6, line 27 - 1''''

IN THE CLAIMS

In Claim 1 (column 7, line 6), please delete the semi-colon (;) after the word "comprising" and substitute therefor a colon (:).

UNITED STATES PATENT AND TRADEMARK OFFICE
CERTIFICATE OF CORRECTION

PATENT NO. : 4,606,642

DATED : August 19, 1986

INVENTOR(S) : Guenther Nelle

It is certified that error appears in the above-identified patent and that said Letters Patent is hereby corrected as shown below:

```
Please put the following in italics:

In Claim 2 (column 7, line 20)  -  1'     (in both instances)
In Claim 3 (column 7, line 26)  -  1'
In Claim 3 (column 7, line 27)  -  1'
In Claim 4 (column 7, line 34)  -  1''
In Claim 5 (column 7, line 38)  -  1'''
In Claim 6 (column 7, line 56)  -  1''''  (in both instances)
In Claim 7 (column 7, line 60)  -  1'
In Claim 8 (column 7, line 64)  -  1'
```

Signed and Sealed this

Twentieth Day of September, 1988

*Attest:*

DONALD J. QUIGG

*Attesting Officer*        *Commissioner of Patents and Trademarks*